United States Patent
Donzis et al.

(10) Patent No.: US 10,348,738 B2
(45) Date of Patent: *Jul. 9, 2019

(54) SYSTEM, METHOD AND COMPUTER READABLE MEDIUM FOR MESSAGE AUTHENTICATION TO SUBSCRIBERS OF AN INTERNET SERVICE PROVIDER

(71) Applicant: PERFTECH, INC., San Antonio, TX (US)

(72) Inventors: Henry M. Donzis, San Antonio, TX (US); Lewis T. Donzis, San Antonio, TX (US); Rodney D. Frey, San Antonio, TX (US); John A. Murphy, San Antonio, TX (US); Jonathan E. Schmidt, San Antonio, TX (US)

(73) Assignee: PERFTECH, INC., San Antonio, TX (US)

( * ) Notice: Subject to any disclaimer, the term of this patent is extended or adjusted under 35 U.S.C. 154(b) by 73 days.

This patent is subject to a terminal disclaimer.

(21) Appl. No.: 14/988,111

(22) Filed: Jan. 5, 2016

(65) Prior Publication Data

US 2016/0234227 A1 Aug. 11, 2016
US 2018/0176231 A9 Jun. 21, 2018

Related U.S. Application Data

(63) Continuation of application No. 13/964,264, filed on Aug. 12, 2013, now Pat. No. 9,231,961, which is a continuation of application No. 13/445,208, filed on Apr. 12, 2012, now Pat. No. 8,533,476, which is a
(Continued)

(51) Int. Cl.
| | |
|---|---|
| H04L 29/06 | (2006.01) |
| G06F 16/955 | (2019.01) |
| H04L 12/58 | (2006.01) |
| H04L 29/08 | (2006.01) |

(52) U.S. Cl.
CPC ........ *H04L 63/126* (2013.01); *G06F 16/9558* (2019.01); *G06F 16/9566* (2019.01); *H04L 51/12* (2013.01); *H04L 51/24* (2013.01); *H04L 63/06* (2013.01); *H04L 63/08* (2013.01); *H04L 67/22* (2013.01); *H04L 67/24* (2013.01); *H04L 67/306* (2013.01); *H04L 63/123* (2013.01)

(58) Field of Classification Search
CPC ....... H04L 63/06; H04L 63/08; H04L 63/126; H04L 63/123; H04L 67/22; H04L 67/24; H04L 67/306; H04L 51/12; H04L 51/24; G06F 17/30882; G06F 17/30887
USPC ............................................................ 726/5
See application file for complete search history.

(56) References Cited

U.S. PATENT DOCUMENTS 5,687,212 A * 11/1997 Kinser, Jr. ............... H04M 3/08
379/14
5,920,846 A * 7/1999 Storch .............. G06Q 10/06311
379/15.03
(Continued)

*Primary Examiner* — Shahriar Zarrineh

(57) ABSTRACT

An internet service provider (ISP) is configured to provide notification messages such as service updates to subscribers via redirected web pages. In order for the web pages to be treated as originating from the ISP, the ISP provides a shared secret in the browser message. The shared secret may be a secret not derivable by viruses or trojans in the subscriber computer, such as a MAC address of the subscriber modem.

19 Claims, 5 Drawing Sheets

Related U.S. Application Data continuation of application No. 12/004,645, filed on Dec. 24, 2007, now Pat. No. 8,161,284.

(60) Provisional application No. 60/877,500, filed on Dec. 28, 2006.

(56) References Cited

U.S. PATENT DOCUMENTS

| | | | | |
|---|---|---|---|---|
| 6,029,150 A * | 2/2000 | Kravitz | G06Q 20/02 | 705/39 |
| 6,119,167 A * | 9/2000 | Boyle | H04L 12/18 | 709/203 |
| 6,133,912 A * | 10/2000 | Montero | G06Q 30/02 | 715/716 |
| 6,337,899 B1 * | 1/2002 | Alcendor | H04Q 3/0029 | 370/263 |
| 6,516,203 B1 * | 2/2003 | Enzmann | H04M 1/575 | 455/414.1 |
| 6,584,492 B1 * | 6/2003 | Cezar | G06Q 30/02 | 709/203 |
| 6,643,360 B1 * | 11/2003 | Reine | H04L 12/587 | 358/402 |
| 7,069,309 B1 * | 6/2006 | Dodrill | H04L 41/12 | 709/219 |
| 7,130,895 B2 * | 10/2006 | Zintel | H04L 12/2805 | 709/220 |
| 7,266,821 B2 * | 9/2007 | Polizzi | G06F 16/954 | 718/100 |
| 7,325,192 B1 * | 1/2008 | Bialek | G06F 16/958 | 715/255 |
| 8,428,604 B2 * | 4/2013 | Davies | H04L 51/24 | 370/395.5 |
| 8,881,233 B2 * | 11/2014 | Chrysanthakopoulos | H04L 43/0817 | 703/22 |
| 8,903,903 B2 * | 12/2014 | Benedyk | H04L 67/24 | 709/204 |
| 8,965,999 B1 * | 2/2015 | O'Neil | G06Q 20/123 | 709/203 |
| 9,104,886 B1 * | 8/2015 | Dolbakian | G06F 21/62 | |
| 9,451,422 B2 * | 9/2016 | Huotari | H04L 12/5815 | |
| 9,614,686 B2 * | 4/2017 | Ramsdell | H04L 12/14 | |
| 2001/0037464 A1 * | 11/2001 | Persels | H04L 51/30 | 726/5 |
| 2001/0054064 A1 * | 12/2001 | Kannan | G06F 17/30867 | 709/203 |
| 2002/0026352 A1 * | 2/2002 | Murata | G06Q 30/02 | 705/14.46 |
| 2002/0057285 A1 * | 5/2002 | Nicholas, III | G06F 3/04812 | 715/700 |
| 2002/0073088 A1 * | 6/2002 | Beckmann | G06F 17/30566 | |
| 2002/0078007 A1 * | 6/2002 | Herrero | G06Q 10/10 | |
| 2002/0138582 A1 * | 9/2002 | Chandra | G06Q 10/10 | 709/206 |
| 2002/0165849 A1 * | 11/2002 | Singh | G06Q 10/087 | |
| 2002/0165967 A1 * | 11/2002 | Morgan | G06F 17/30867 | 709/227 |
| 2002/0169760 A1 * | 11/2002 | Cheung | G06F 17/30864 | |
| 2002/0169953 A1 * | 11/2002 | Moharram | H04L 63/0823 | 713/151 |
| 2002/0181694 A1 * | 12/2002 | Mani | H04L 29/06027 | 379/373.02 |
| 2003/0021393 A1 * | 1/2003 | Caharel | H04M 3/533 | 379/67.1 |
| 2003/0188017 A1 * | 10/2003 | Nomura | H04L 12/14 | 709/241 |
| 2003/0220978 A1 * | 11/2003 | Rhodes | H04L 51/12 | 709/206 |
| 2004/0003072 A1 * | 1/2004 | Mathew | G06F 17/30867 | 709/223 |
| 2004/0043810 A1 * | 3/2004 | Perlin | G06Q 30/02 | 463/16 |
| 2004/0086094 A1 * | 5/2004 | Bosik | H04M 3/42093 | 379/88.12 |
| 2004/0088235 A1 * | 5/2004 | Ziekle | G06Q 30/04 | 705/34 |
| 2004/0103088 A1 * | 5/2004 | Cragun | G06F 17/30545 | |
| 2004/0117358 A1 * | 6/2004 | von Kaenel | G06F 17/30241 | |
| 2004/0122730 A1 * | 6/2004 | Tucciarone | G06Q 10/107 | 705/14.36 |
| 2004/0122735 A1 * | 6/2004 | Meshkin | G06Q 30/02 | 705/14.27 |
| 2004/0139011 A1 * | 7/2004 | Kozee | G06Q 20/102 | 705/40 |
| 2004/0143546 A1 * | 7/2004 | Wood | G06Q 20/102 | 705/40 |
| 2004/0157654 A1 * | 8/2004 | Kataoka | A63F 13/12 | 463/4 |
| 2005/0027594 A1 * | 2/2005 | Yasnovsky | G06Q 30/02 | 705/14.55 |
| 2005/0027631 A1 * | 2/2005 | McAtee | G06Q 40/04 | 705/36 R |
| 2005/0171844 A1 * | 8/2005 | Ferber | G06Q 30/02 | 705/14.69 |
| 2005/0177515 A1 * | 8/2005 | Kalavade | H04L 63/0853 | 705/52 |
| 2005/0268237 A1 * | 12/2005 | Crane | G06F 3/0481 | 715/732 |
| 2006/0026067 A1 * | 2/2006 | Nicholas | G06Q 30/00 | 705/14.58 |
| 2006/0026552 A1 * | 2/2006 | Mazzitelli | G06F 9/465 | 717/101 |
| 2006/0109827 A1 * | 5/2006 | Zhang | H04L 29/06 | 370/338 |
| 2006/0112398 A1 * | 5/2006 | Mukkamala | G06F 9/54 | 719/316 |
| 2006/0190354 A1 * | 8/2006 | Meisel | G06Q 20/10 | 705/14.73 |
| 2006/0282328 A1 * | 12/2006 | Gerace | G06Q 10/10 | 705/14.66 |
| 2007/0210908 A1 * | 9/2007 | Putterman | G08B 27/008 | 340/506 |
| 2007/0298886 A1 * | 12/2007 | Aguilar, Jr. | G06N 3/006 | 463/42 |
| 2008/0082686 A1 * | 4/2008 | Schmidt | H04L 29/06 | 709/239 |
| 2008/0242324 A1 * | 10/2008 | Smuga | H04L 51/38 | 455/466 |
| 2012/0311676 A1 * | 12/2012 | Ibasco | G06Q 10/10 | 726/4 |
| 2013/0080777 A1 * | 3/2013 | Martell | H04L 9/14 | 713/168 |
| 2013/0110943 A1 * | 5/2013 | Menon | G06Q 10/107 | 709/206 |

\* cited by examiner

SYSTEM, METHOD AND COMPUTER READABLE MEDIUM FOR MESSAGE AUTHENTICATION TO SUBSCRIBERS OF AN INTERNET SERVICE PROVIDER

CROSS REFERENCE TO RELATED APPLICATIONS

The present patent application is a continuation of and claims the benefit of U.S. patent application Ser. No. 13/964,264, filed Aug. 12, 2013, entitled SYSTEM, METHOD AND COMPUTER READABLE MEDIUM FOR MESSAGE AUTHENTICATION TO SUBSCRIBERS OF AN INTERNET SERVICE PROVIDER, issued U.S. Pat. No. 9,231,961, issued Jan. 5, 2016, which is a continuation of U.S. patent application Ser. No. 13/445,208, filed Apr. 12, 2012, entitled SYSTEM, METHOD AND COMPUTER READABLE MEDIUM FOR MESSAGE AUTHENTICATION TO SUBSCRIBERS OF AN INTERNET SERVICE PROVIDER, issued U.S. Pat. No. 8,553,476, issued Sep. 10, 2013, which is a continuation of U.S. patent application Ser. No. 12/004,645, filed Dec. 24, 2007, entitled SYSTEM, METHOD AND COMPUTER READABLE MEDIUM FOR MESSAGE AUTHENTICATION TO SUBSCRIBERS OF AN INTERNET SERVICE PROVIDER, issued U.S. Pat. No. 8,161,284, issued Apr. 17, 2012, which in turn is related to and claims the benefit of provisional patent application Ser. No. 60/877,500, filed Dec. 28, 2006, entitled ABUSE SENTRY, AUDIT SENTRY, AUTHENTICATION ICON the entire contents of which each are incorporated by reference herein.

FIELD OF THE INVENTION

This disclosure relates to providing messages and notifications to subscribers of an internet service provider (ISP) and in particular to providing authentication of messages and notifications.

BACKGROUND OF THE INVENTION

In the Applicant's earlier patent applications, Ser. No. 10/023,674, filed on Dec. 18, 2001, now issued U.S. Pat. No. 7,328,266, issued on Feb. 5, 2008, and Ser. No. 10/623,893, filed on Jul. 21, 2003, now issued U.S. Pat. No. 8,108,524, issued on Jan. 31, 2012, the entire contents of which are explicitly incorporated herein by reference, the present Applicants described networks in which communications could be provided from an ISP to a subscriber of the ISP. In the referenced applications, a redirection device was placed in the path of upstream traffic from the subscriber. The redirection device, operating under the control of a consolidating and management device elsewhere in the network, processed upstream data packets to determine when targeted communications to the subscriber were required. In particular examples provided in the applications referenced above, subscribers of an ISP attempting access to an internet service were provided with notification of potential internet service issues. A further application of providing communications to subscribers includes notifying subscribers of potential virus infections and e-mail spamming such as disclosed in the Applicant's co-filed patent application, Ser. No. 12/004,634, the entire contents of which are explicitly incorporated herein by reference. A further application of providing communications to subscribers includes notifying subscribers of potential theft of internet service on an unsecured subscriber account, as described in the Applicant's co-filed patent application Ser. No. 12/004,635, the entire contents of which are explicitly incorporated herein by reference A problem with providing notifications to subscribers through redirected web pages as in the above referenced patent applications, is a tendency for such redirected web pages to have a similar look and feel to web pages that typically lead to virus and Trojan infection. Subscribers may therefore be unlikely to treat the redirected web pages as genuine. In particular, where the redirected web pages contain links to downloadable remedial facilities, as described in the patent applications referenced above, subscribers are unlikely to click through links where the links look like they potentially contain viruses.

What is a required is a system, method and computer readable medium for authenticating notifications and messages provided to subscribers in order to assure the subscriber that the message is, indeed, originating by the ISP.

SUMMARY OF THE INVENTION

In one embodiment of the disclosure, there is provided a method of authenticating an unsolicited notification from an ISP to a subscriber, the method comprising determining a subscriber identity; retrieving a shared secret associated with said subscriber identity from at least one database; generating a notification incorporating said shared secret; and displaying said notification to said subscriber.

In one embodiment of the disclosure, there is provided a network comprising at least one internet service provider that provides an internet connection for one or more subscriber accounts; and at least notification system comprising at least one database; and at least one query engine that executes one or more queries on said at least one database; wherein said notification system receives data received by said at least one internet service provider from said one or more subscribers; wherein said query engine executes a first query on said at least one database to determine a subscriber identity associated with said data; wherein said query engine executes a second query on said at least one database using said subscriber identity to retrieve a shared secret; wherein said notification system generates an unsolicited notification incorporating said shared secret; and wherein said internet service provider provides said notification to a subscriber associated with said subscriber identity.

In one embodiment of the disclosure, there is provided an internet service provider comprising at least one router; and a packet processing engine; wherein said at least one router routes one or more data packets received by said router from a subscriber to said packet processing engine; wherein said packet processing engine determines a subscriber identity from said one or more packets; wherein said packet processing engine retrieves a shared secret associated with said subscriber identity; and wherein said packet processing engine redirects a URL page request from said subscriber to a URL page incorporating said shared secret.

In one embodiment of the disclosure, there is provided a method of providing a message from an internet service provider to a subscriber comprising generating a notification event; generating an unsolicited message in response to said notification event; retrieving a shared secret stored in said internet service provider; incorporating said shared secret into said message; and displaying said message to said subscriber.

In one embodiment of the disclosure, there is provided a computer readable medium comprising instructions for receiving a request for web page content from a subscriber; retrieving a shared secret associated with said subscriber;

providing said web page content to said subscriber; and providing said shared secret with said web page content.

BRIEF DESCRIPTION OF THE DRAWINGS

The invention will now be described, by way of example only, with reference to specific embodiments and to the accompanying drawings in which.

DETAILED DESCRIPTION OF THE INVENTION

Figure 1:
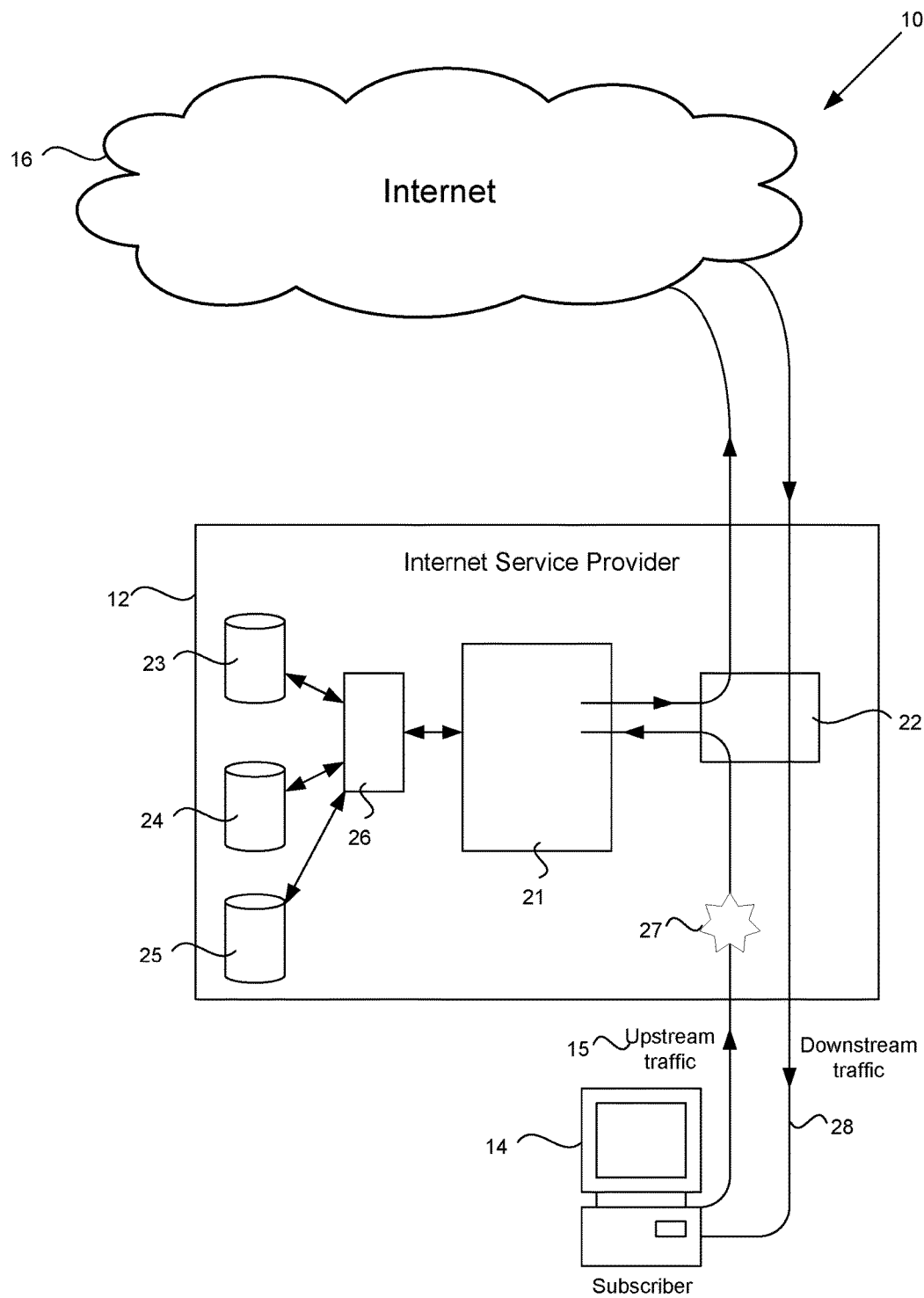
FIG. 1 schematically illustrates a network in accordance with an embodiment of the disclosure.

The present embodiments utilize many of the features and functionalities of the networks described in the Applicant's earlier patent applications referenced above. In FIG. 1, there is shown a system or network 10 in accordance with an embodiment of the disclosure. In the network 10, an ISP 12 provides a link between a subscriber device 14 and the internet 16. For the sake of clarity, in the following embodiments the subscriber device 14 will be referred to specifically as a personal computer, or PC. However, it will be readily understood by the person skilled in the art that the subscriber device 14 may be any internet enabled device such as a personal computer (PC), laptop, palm device, mobile telephone, gaming console and the like, and all such internet enabled devices are to be considered equivalent.

The network 10 includes at least one redirection device 21 that is placed at the path of upstream traffic 15 from the subscriber 14, either in the path or in a position to monitor the path. As described in the above referenced patent applications, the redirection device 21 may be placed at many points within the network 10 and is optionally placed at an edge of the network that represents the last scaleable point in the operator's network. In one embodiment, the redirection device 21 is placed within the ISP 12. The term redirection device is used herein in order to provide consistency with the Applicant's earlier patent applications referenced above. The person skilled in the art will understand from the foregoing description that in the context of the present disclosure, the redirection device may not perform a redirection function in all embodiments.

The network 10 also includes a consolidating and management device 26, for example of the type as described in the Applicant's earlier applications referenced above. The consolidating and management device 26 is operatively associated with the redirection device 21 to form an authentication system, and more particularly a packet processing system, as will be described in greater detail below.

The ISP 12 includes a router or switch 22, a redirection device 21 as described above and an address provisioning database 23. The address provisioning database 23 stores associations between subscriber accounts of the ISP and IP addresses allocated to the subscribers. A second database 24 stores associations between subscribers of the ISP and shared secrets of the subscribers, as will be described below. The consolidating and management device 26 provides a query engine for accessing data from the databases 23, 24 in response to requests from the redirection device 21. A third database 25 may store pending notification information.

While three databases 23, 24, 25 are illustrated and described herein for clarity, the person skilled in the art will readily understand that the databases 23, 24, 25 can be consolidated into a single database or that the databases can be divided into a higher number of databases. For example, the databases 23, 24, 25 may be consolidated with a database for storing an association between a subscriber and an electronic mail sending profile of the subscriber, as described in the Applicant's co-pending application Ser. No. 12/004,634, referenced above. Alternatively, or in addition, the databases 23, 24, 25 may be consolidated with a database for storing an association between a subscriber account and one or more users of the subscriber account, as described in the Applicant's co-pending application Ser. No. 12/004,635, referenced above.

Figure 6:
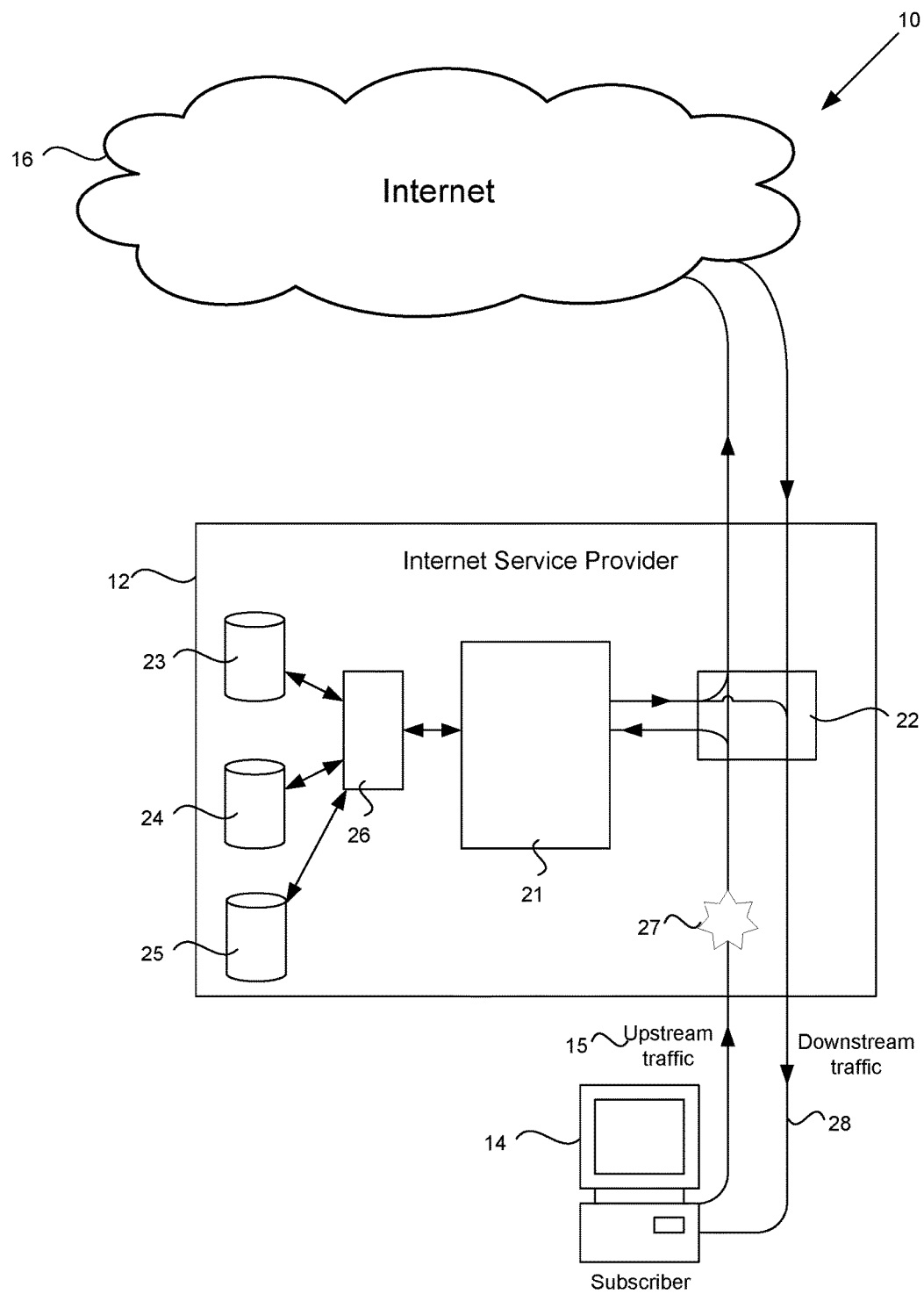
FIG. 6 represents an alternative network configuration.

Downstream traffic from the internet 16, indicated by path 28 is routed by the router 22 to the intended subscriber 14. Upstream traffic in the form of data packets 27 follow the path 15 from the subscriber 14 to be routed by the router 22 to the redirection device 21, thence back to the router 22 and onto the internet 16. In an alternative embodiment shown in FIG. 6, upstream traffic 15 passes directly through the Internet provider with the addition of a "mirror port" or "tap" allowing the redirector, 21, to monitor the upstream traffic.

Figure 2:
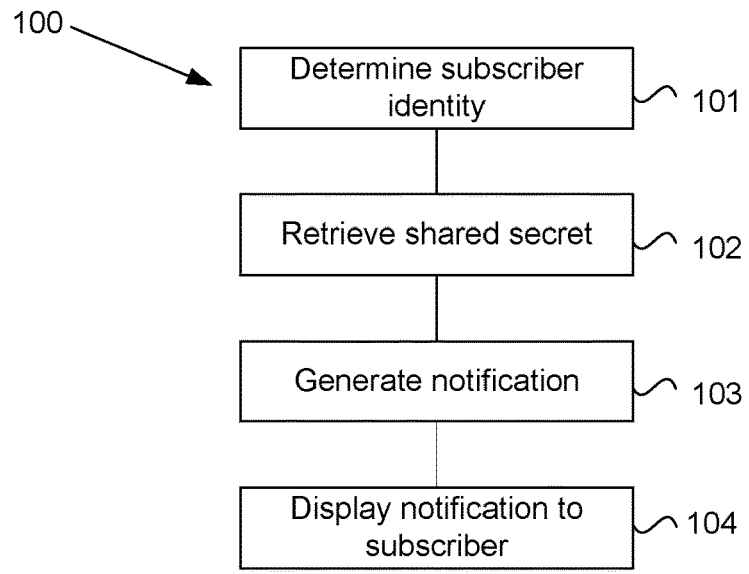
FIG. 2 represents a method for authenticating a message from an ISP to a subscriber.

The operation of the system 10 will now be described with reference to FIG. 1 and to the flowchart 100 illustrated in FIG. 2. Initially, data such as a URL page request is received from the subscriber 14 and a subscriber identity associated with the data message is identified at step 101. The system 10 then retrieves a shared secret (step 102), for example from database 24, and generates a notification message incorporating the shared secret (step 103). At step 104, the notification message incorporating the shared secret is provided to the subscriber.

Figure 3:
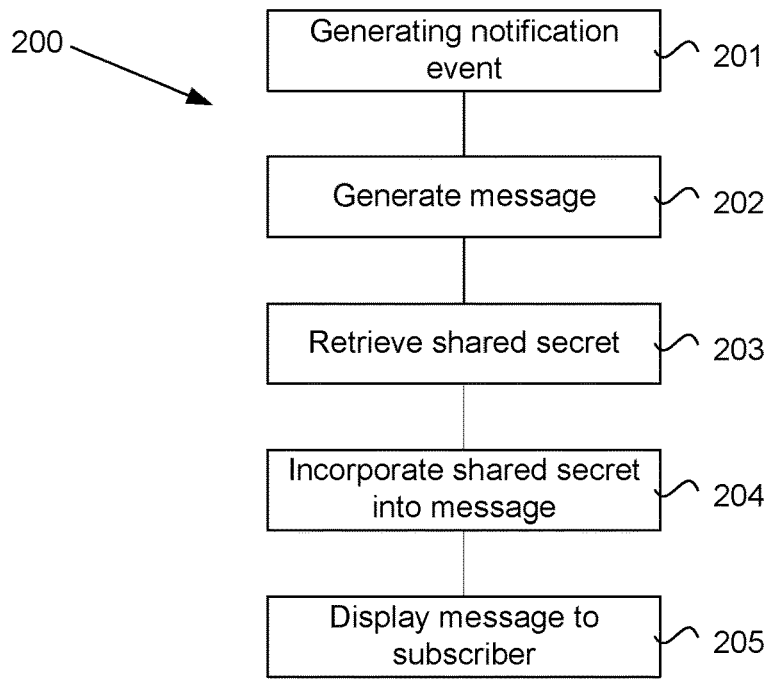
FIG. 3 represents a method for redirecting URL page requests to incorporate an authenticated message.

In one embodiment, the method steps described above are performed within the ISP as illustrated in the flowchart 200 of FIG. 3. Initially, data packets 27, such as URL page requests, originating at the subscriber are received in the ISP 12 and provided to the router 22. The router 22 passes selected packets, or in an alternative embodiment, copies of the packets, to the redirection device 21 for processing. The router routes one or more data packets from the subscriber device to a packet processing engine, and the router routes TCP SYN packets to the packet processing engine. In response to receiving a TCP SYN packet, the packet processing engine determines the subscriber identity from the TCP SYN packet and determines if a notification event is current for the subscriber identity.

The redirection device 21 first analyzes the data packet 27 to retrieve an IP address of the data packet 27. The redirection device 21 forwards the IP address to the consolidation and management device 26, which executes a first query on the address provisioning database 23 to retrieve a subscriber identity associated with the IP address. At step 201, the redirection device 21 then determines if any notifications are required or pending for the subscriber, i.e. if any notification events have occurred, and if so, generates the appropriate message for the notification event (step 202). The redirection device 21 then executes a second query on the shared secret database 24 using the subscriber identity to retrieve the subscriber's shared secret (step 203). The shared secret is incorporated into the message (step 204) and then the message and the shared secret are displayed to the subscriber (step 205).

Figure 4:
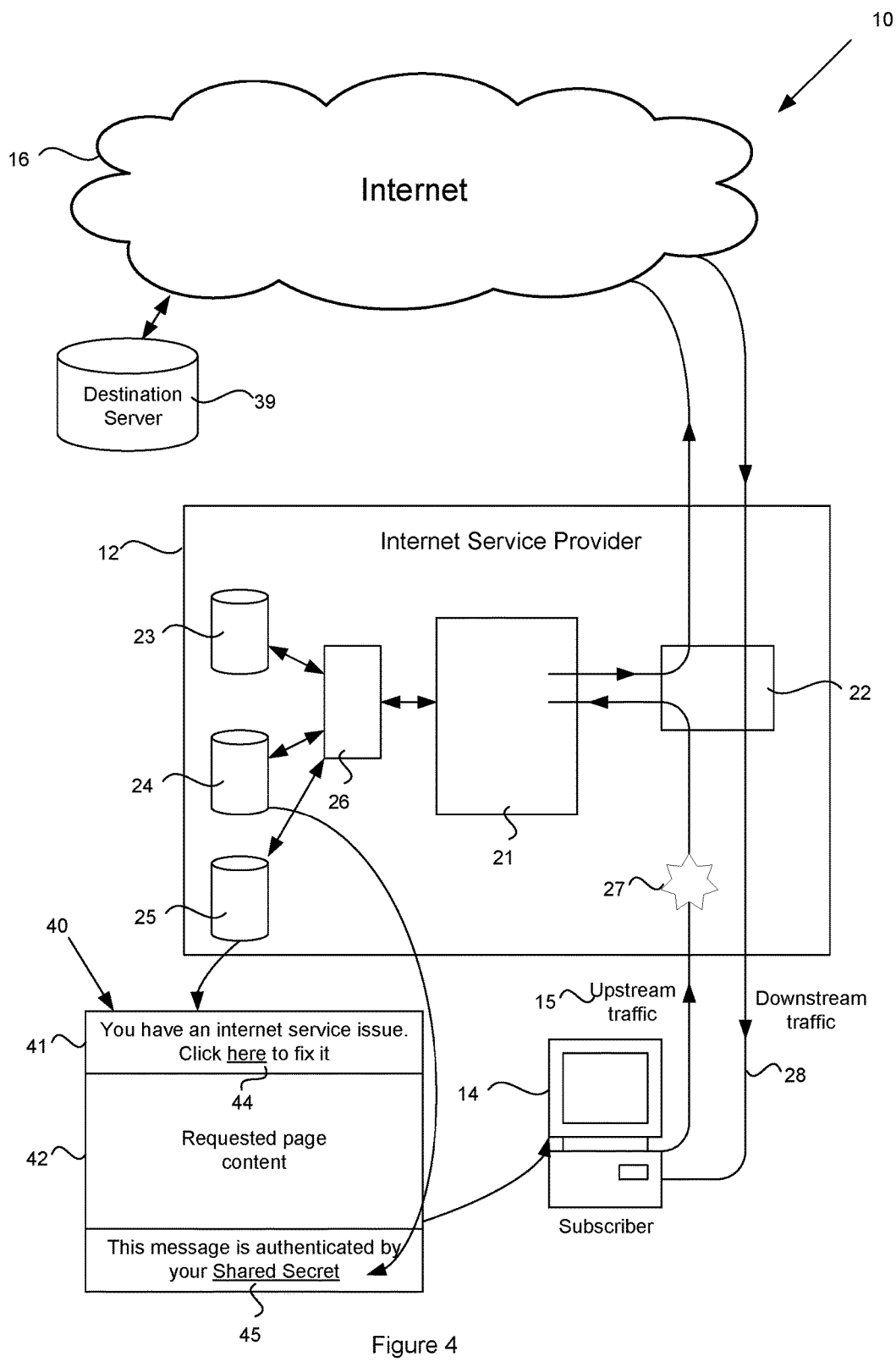
FIG. 4 schematically illustrates providing an authenticated web-browser message to a subscriber.

As described in the Applicant's earlier applications referenced above, subscriber notifications may be sent using web-browser messages. With reference to FIG. 4, when a notification is required a flag may be set in the notification database 25 that identifies the subscriber account as requiring a notification. For example, the notification flag may be set in response to notification events, such as internet service issues, detection of spam e-mailing originating from the subscriber's account, detection of excess users on the subscriber's account outside of a terms of service agreement, or for other notification events which may be apparent to the person skilled in the art.

The redirection device determines whether a notification is pending for a subscriber by executing a query, via the consolidating and management device 26, to the notification database 25 using the subscriber identity. If the query outcome determines that a notification is pending, the redirection device 21 provides to the subscriber an HTML redirection to destination server 39 that combines the destination URL in the page request and the URL for the message into a new page redirection for the subscriber's browser to fetch. In addition to the requested page content 42, the new page 40 includes a banner 41 or similarly visible message that indicates the message to the subscriber 14. Depending on the type of notification event being reported, the banner message 41 may indicate a hyperlink 44 to a downloadable facility for remedying the problem. In addition to the page content 42 and message 41, the page 40 incorporates the shared secret 45 retrieved from the shared secret database 24, to indicate to the user that the message is genuinely derived from the ISP.

It will be apparent to the person skilled in the art that notification events can occur and be reported spontaneously, i.e. without executing a query to the notification database. For example, a notification event can occur if the ISP detects that a current user of a subscriber's account is an excess user, as described in the applicant's co-pending application Ser. No. 12/004,635 referenced above.

Shared secrets may take any suitable form apparent to the person skilled in the art. In one embodiment, a shared secret such as a password or answer to a common question, may be provided by the subscriber, for example through a web-based form as is known. In one embodiment, the shared secret may be provided at the time the subscriber registers for the ISP service. In one embodiment, the shared secret may be derived from service details of the subscriber, such as a MAC address of the subscriber modem, since this cannot be derived by an in-computer virus nor from an external source without confidential information from the ISP. It is preferred that the shared secret by independently verifiable at both the subscriber end and the ISP end.

Figure 5:
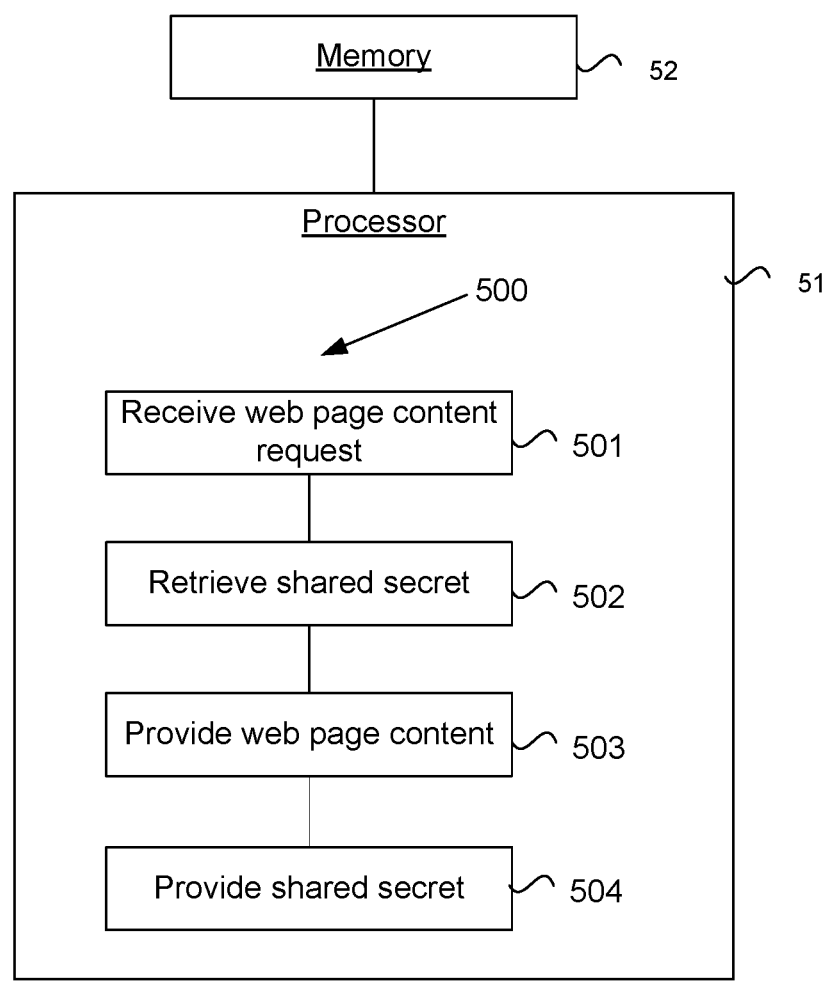
FIG. 5 represents a processor executing an instruction set for authenticating ISP messages.

In one embodiment depicted in FIG. 5, the ISP 12 includes at least one processor 51 operatively associated with at least one memory 52. The memory 52 stores an instruction set 500 executable on the processor 51. Executing the instructions causes the processor 51 to receive data from a subscriber account (501). The processor 51 then determines a number of users associated with the subscriber account (502) and compares the number of users with a threshold (503). The processor 51 then determines an action to be taken depending upon an outcome of the comparison (504). In one embodiment, the action taken may be any of the actions described previously.

The presently described embodiments demonstrate mechanisms that automatically authenticate ISP originating messages provided to subscribers of the ISP. By authenticating the messages, the subscribers are more likely to treat the messages as genuine, rather than as originating from a $3^{rd}$ party trying to "spoof" an ISP provided message with a look-alike format. Where the messages contain instructions and links for fixing subscriber issues, the subscriber is more likely to follow the instructions and undertake remedial actions, thereby improving the service for both the subscriber and the ISP.

An advantage of the embodiments herein described include that authenticating of messages can be performed using network devices that are relatively simple to install within the ISP and do not require all network traffic to pass through them. In particular, the redirection device 21 requires only read-only access to the data packets that it processes. A further advantage is that the embodiments may be implemented without updates being required to subscriber hardware or software and thus are instantly applicable across all subscribers to the ISP.

While one redirection device is shown within the ISP, the person skilled in the art will readily understand that any number of redirections devices may be provided for processing upstream data packets. In particular, separate redirection devices may be provided for separate channels within the ISP. Typically, a single consolidating and management device can be used to manage a plurality of redirections devices and to execute the queries to the databases. However, the person skilled in the art will readily understand that a plurality of consolidating and management devices may be employed.

While a single ISP has been described and illustrated, the person skilled in the art will readily understand that a plurality of ISPs may be provided that utilize a common authentication system or that each have an associated authentication system as described above.

Although embodiments of the present invention have been illustrated in the accompanied drawings and described in the foregoing description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the blocks, modules, processors or memories. Also, these capabilities may be performed in the current manner or in a distributed manner and on, or via, any device able to provide and/or receive information. Further, although depicted in a particular manner, various modules or blocks may be repositioned without departing from the scope of the current invention. Still further, although depicted in a particular manner, a greater or lesser number of modules and connections can be utilized with the present invention in order to accomplish the present invention, to provide additional known features to the present invention, and/or to make the present invention more efficient. Also, the information sent between various modules can be sent between the modules via at least one of a data network, the Internet, an Internet Protocol network, a wireless source, and a wired source and via plurality of protocols.

What is claimed is:

1. A method, comprising:
   receiving a uniform resource locator (URL) page request from a subscriber device associated with a subscriber;

determining a subscriber identity from the URL page request;
determining whether a notification is pending for a subscriber by executing a query on at least one database using the subscriber identity associated with a shared secret;
responsive to determining whether the notification is pending, retrieving the shared secret from the at least one database and generating a notification incorporating the shared secret, via a processor, wherein the shared secret comprises at least one of a subscriber created information secret created by the subscriber and a subscriber device information secret based on a service detail identifier associated with the subscriber device;
transmitting the notification to the subscriber device; and
loading a banner message with notification content and the shared secret on a banner message portion of a browser interface of the subscriber device to provide an indication on the browser interface of the subscriber device that the banner message and notification content are genuinely linked to a subscriber's account.

2. The method according to claim 1 further comprising determining the identity of the subscriber, wherein the determining comprises determining an internet protocol (IP) address, and retrieving said subscriber identity from said at least one database using said IP address.

3. The method according to claim 1 further comprising displaying said notification via the subscriber device.

4. The method according to claim 1 further comprising generating the pending notification.

5. The method according to claim 1 further comprising storing said pending notification in said at least one database.

6. The method according to claim 1 further comprising generating said notification in response to receiving said URL page request.

7. The method according to claim 1 wherein providing said notification to said subscriber comprises redirecting said URL page request such that the subscriber retrieves a URL page comprising said notification.

8. The method according to claim 7 wherein said URL page comprises a hyperlink to a downloadable remedial facility.

9. A network, comprising:
at least one notification system comprising:
at least one database;
at least one query engine that executes one or more queries on said at least one database;
a redirection device; and
wherein the redirection device receives a uniform resource location (URL) page request from a subscriber device associated with a subscriber and determines a subscriber identity from the URL page request;
wherein said query engine executes a query on said at least one database using the subscriber identity to retrieve a shared secret and determines whether a notification is pending for the subscriber via a query on the at least one database using said subscriber identity;
responsive to a determination as to whether the notification is pending, the notification system retrieves the shared secret from the at least one database and generates a notification incorporating the shared secret, wherein the shared secret comprises at least one of a subscriber created information secret created by the subscriber and a subscriber device information secret based on a service detail identifier associated with the subscriber device; and
load a banner message with notification content and the shared secret on a banner message portion of a browser interface of the subscriber device to provide an indication on the browser interface of the subscriber device that the banner message and notification content are genuinely linked to a subscriber's account.

10. The network according to claim 9 wherein said notification system redirects said URL page request to a URL page incorporating said notification.

11. The network according to claim 9 wherein said at least one database comprises a database associating the subscriber identity with the shared secret of the subscriber associated with said subscriber identity.

12. The network according to claim 11 wherein said shared secret comprises a MAC address of at least one subscriber device.

13. The network according to claim 12 wherein said notification is provided to the at least one subscriber device, and wherein said at least one subscriber device comprises a modem.

14. A system, comprising:
a packet processing engine;
a redirection device; and
a subscriber device communicably coupled to said packet processing engine;
wherein the redirection device receives a uniform resource location (URL) page request from a subscriber device associated with a subscriber and determines a subscriber identity from the URL page request;
wherein said packet processing engine retrieves a shared secret associated with the subscriber identity from at least one database and determines whether a notification is pending for the subscriber via a query on the at least one database using the subscriber identity;
responsive to a determination whether the notification is pending, the packet processing engine redirects the uniform resource locator (URL) page request including the shared secret to the subscriber device, wherein the shared secret comprises at least one of a subscriber created information secret created by the subscriber and a subscriber device information secret based on a service detail identifier associated with the subscriber device; and
the subscriber device loads a banner message with notification content and the shared secret on a banner message portion of a browser interface of the subscriber device to provide an indication on the browser interface of the subscriber device that the banner message and notification content are genuinely linked to a subscriber's account.

15. The system according to claim 14 comprising at least one router that routes one or more data packets from the subscriber device to said packet processing engine, wherein said router routes TCP SYN packets to said packet processing engine.

16. The system according to claim 15 wherein in response to receiving a TCP SYN packet said packet processing engine determines said subscriber identity from said TCP SYN packet determines if a notification event is current for said subscriber identity.

17. The system according to claim 16, wherein said at least one database that associates one or more notification events with one or more subscribers and wherein said packet processing engine executes a query on said at least one database to determine if a notification event is current for said subscriber.

18. The system according to claim 14 further comprising:
a query engine;
wherein said packet processing engine:
retrieves an internet protocol (IP) address provided in said one or more data packets;
utilizes said query engine to retrieve said subscriber identity using said IP address from said at least one database; and
utilizes said query engine to retrieve said shared secret from said at least one database.

19. A method, comprising:
receiving a uniform resource locator (URL) page request from a subscriber device associated with a subscriber;
determining a subscriber identity from the URL page request;
generating via a processor a message in response to a notification event;
determining whether a notification is pending for the subscriber by executing a query on at least one database using the subscriber identity associated with a shared secret;
responsive to determining whether the notification is pending, retrieving the shared secret from the at least one database and incorporating said shared secret into the message, wherein the shared secret comprises at least one of a subscriber created information secret created by the subscriber and a subscriber device information secret based on a service detail identifier associated with the subscriber device;
transmitting the message to the subscriber device; and
loading a banner message with notification content and the shared secret on a banner message portion of a browser interface of the subscriber device to provide an indication on the browser interface of the subscriber device that the banner message and notification content are genuinely linked to a subscriber's account.

* * * * *